US011923162B2

(12) United States Patent
Retardo et al.

(10) Patent No.: US 11,923,162 B2
(45) Date of Patent: Mar. 5, 2024

(54) STEP-TERMINATED SMD FUSE

(71) Applicant: Littelfuse, Inc., Chicago, IL (US)

(72) Inventors: Roel Santos Retardo, Batangas (PH); Kent Harvey Mercado Berenguel, Batangas (PH); P-A-Homer II Dela Torre, Laguna (PH)

(73) Assignee: LITTELFUSE, INC., Chicago, IL (US)

(*) Notice: Subject to any disclaimer, the term of this patent is extended or adjusted under 35 U.S.C. 154(b) by 0 days.

(21) Appl. No.: 17/846,796

(22) Filed: Jun. 22, 2022

(65) Prior Publication Data

US 2023/0420209 A1 Dec. 28, 2023

(51) Int. Cl.
*H01H 85/143* (2006.01)
*H01H 85/055* (2006.01)
*H01H 85/041* (2006.01)

(52) U.S. Cl.
CPC ........ *H01H 85/055* (2013.01); *H01H 85/143* (2013.01); *H01H 2085/0414* (2013.01)

(58) Field of Classification Search
CPC .......... H01H 85/165–1755; H01H 69/02–022; H01H 85/0411; H01H 2085/0412–0414; H01H 85/055; H01H 85/143
See application file for complete search history.

(56) References Cited

U.S. PATENT DOCUMENTS

| | | | | |
|---|---|---|---|---|
| 9,779,904 | B2 * | 10/2017 | Ishikawa | H01H 85/06 |
| 9,852,868 | B2 * | 12/2017 | Yamagishi | H01H 69/02 |
| 9,899,171 | B2 * | 2/2018 | Aurich | H01H 37/761 |
| 10,566,164 | B2 * | 2/2020 | Sherrima | H01H 69/022 |
| 2003/0024105 | A1 * | 2/2003 | Chiu | H01H 85/0411 29/857 |
| 2014/0266565 | A1 * | 9/2014 | Enriquez | H01H 85/143 337/297 |
| 2015/0270085 | A1 * | 9/2015 | Yamagishi | H01H 69/02 337/222 |

* cited by examiner

*Primary Examiner* — Jacob R Crum
(74) *Attorney, Agent, or Firm* — KDW Firm PLLC

(57) ABSTRACT

A fuse includes a stack, a flattened wire, and a terminal. The stack has multiple layers arranged to form steps. The stack has an upper stack with layers of a first size and a lower stack with layers of a second, larger size. The flattened wire is located between the upper stack and the lower stack. The terminal is connected to the flattened wire and includes multiple surfaces to cover the steps at one end of the stack.

11 Claims, 6 Drawing Sheets

500

STEP-TERMINATED SMD FUSE

FIELD OF THE DISCLOSURE

Embodiments of the present disclosure relate to surface mount device (SMD) fuses and, more particularly, to small footprint SMD fuses.

BACKGROUND

Fuses are current-sensitive devices that provide reliable protection for discrete components or circuits by melting under current overload conditions. Characteristics such as breaking capacity, voltage rating, and current rating have traditionally been factors when selecting a fuse. With the miniaturization of technology, there are many applications for very small fuses. Thus, the size (footprint) of the fuse is an additional characteristic to consider.

Surface mount devices (SMDs) are a class of technology that are suitable for surface assembly on a printed circuit board (PCB). SMDs have no leads or short leads for soldering to the PCB. SMDs include passive components, such as resistors and capacitors, discrete components, such as integrated circuits and fuses, and electromechanical devices, such as switches and relays.

SMDs come in a variety of smaller footprints, and are given names such as 1206, 0603, 0201, and more. 1206 SMDs measure 3.2 mm×1.6 mm, 0603 SMDs measure 1.6 mm×0.8 mm, and 0201 SMDs measure 0.6 mm×0.3 mm.

Small footprint SMD fuses are produced using manufacturing operations, such as wire-in-air (WIA), which alternates between thin ceramic or FR4 layers alternated with even thinner epoxy layers. In some cases, contamination may be trapped within the layers of the fuse, which may affect the operation of the small footprint fuse.

It is with respect to these and other considerations that the present improvements may be useful.

SUMMARY

This Summary is provided to introduce a selection of concepts in a simplified form that are further described below in the Detailed Description. This Summary is not intended to identify key or essential features of the claimed subject matter, nor is it intended as an aid in determining the scope of the claimed subject matter.

An exemplary embodiment of a fuse in accordance with the present disclosure may include a stack, a flattened wire, and a terminal. The stack has multiple layers arranged to form steps. The stack has an upper stack with layers of a first size and a lower stack with layers of a second, larger size. The flattened wire is located between the upper stack and the lower stack. The terminal is connected to the flattened wire and includes multiple surfaces to cover the steps at one end of the stack.

Another exemplary embodiment of a fuse in accordance with the present disclosure may include a stack, a fusible element, and a terminal. The stack has alternating structural layers and epoxy layers arranged to form first and second steps. The fusible element is a flattened wire placed between the first step and the second step. Connected to the fusible element, the terminal covers the first step and the second step at one end of the stack. The terminal has three surfaces, one of which covers the first step, with the remaining two covering the second step. The second surface is perpendicular to and connected to the first surface while the third surface is perpendicular to and connected to the second surface, and the first surface is parallel to the third surface.

DETAILED DESCRIPTION

A step-terminated fuse is disclosed. The fuse is made up of a stack of alternating structural and epoxy layers, sized to form two steps, with a fusible element in between. The layers of the upper stack are one size, the layers of the lower stack are a second, larger size. Terminals at either end of the stack have several surfaces to cover ends of the stack. The fusible element consists of a flattened wire with an upper lip and a lower lip at each end of the wire. The length of the fusible element is larger than the length of the upper stack. The upper lip of the flattened wire connects to terminal surfaces of the upper stack and the lower stack. The step-terminated fuse has favorable breaking capacity and $I^2t$ characteristics, as compared to legacy fuses that have castellated terminations.

For the sake of convenience and clarity, terms such as "top", "bottom", "upper", "lower", "vertical", "horizontal", "lateral", "transverse", "radial", "inner", "outer", "left", and "right" may be used herein to describe the relative placement and orientation of the features and components, each with respect to the geometry and orientation of other features and components appearing in the perspective, exploded perspective, and cross-sectional views provided herein. Said terminology is not intended to be limiting and includes the words specifically mentioned, derivatives therein, and words of similar import.

Figure 1:
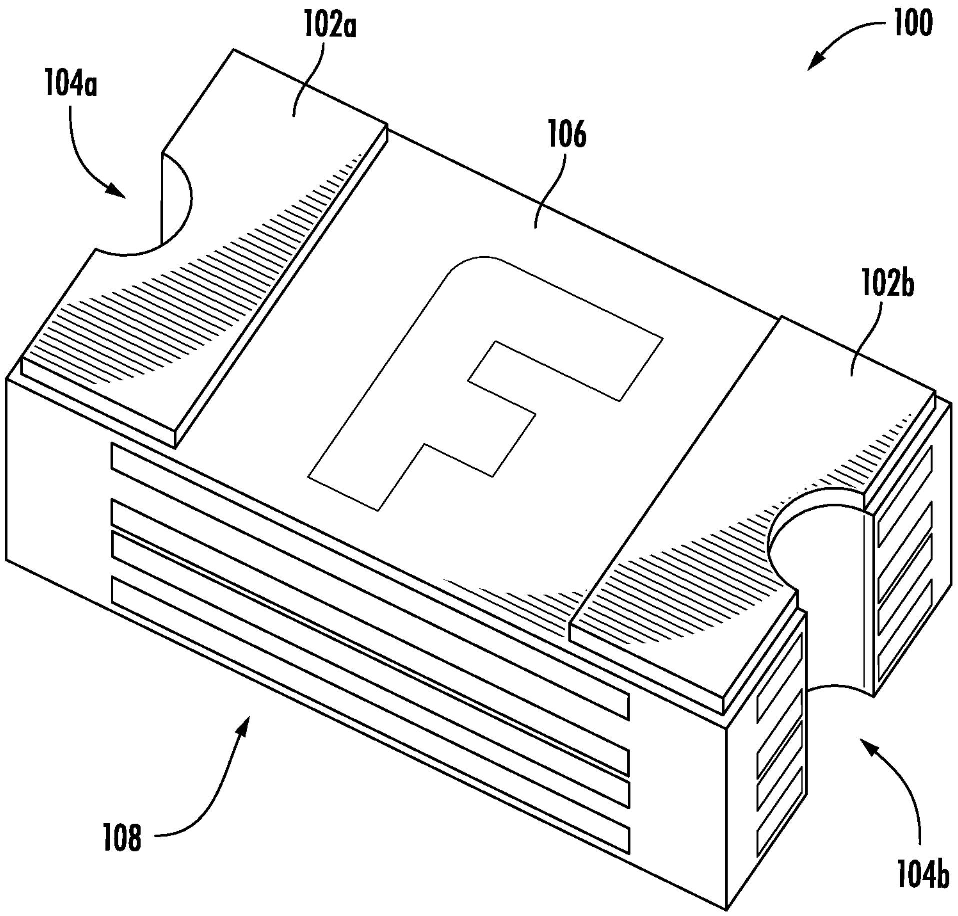
FIG. 1 (PRIOR ART)
FIG. 1 is a diagram illustrating a castellated fuse, in accordance with the prior art.

FIG. 1 is a representative drawing of a fuse 100, according to the prior art. The fuse 100 is a type of surface mount device (SMD), known herein also as an SMD fuse 100. The fuse 100 has a body 106 with a terminal 102*a* at one end of the body and a terminal 102*b* at the opposite end (collectively, "terminals 102"). Layers 108 are shown at one end to show that the fuse 100 is formed from multiple layers stacked together.

Additionally, the fuse 100 features a castellation 104*a* at one end of the body, near terminal 102*a*, and a second castellation 104*b* at the opposite end, near terminal 102*b* (collectively, "castellations 104"). The castellations 104 appear as half-moon shapes cut out of respective terminals 102 to increase the surface area of the terminals, thereby providing more surface area for soldering the fuse 100 to a printed circuit board (PCB). Particularly for small footprints such as the 0603 SMDs, castellated fuses can sometimes be compromised by trapped contamination and plating residue. The contamination and plating residue may reside at the castellations 104 or in the layers 108, which can compromise the operation of the fuse.

FIGS. 2A-2D are representative drawings of a step-terminated fuse 200, according to exemplary embodiments.

Figure 2A:
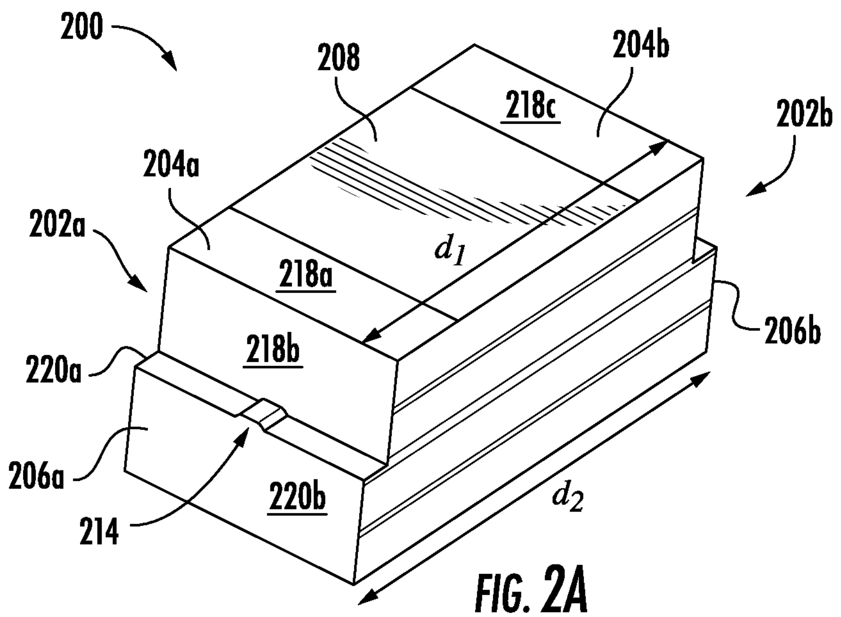
FIGS. 2A-2D are diagrams illustrating a step-terminated SMD fuse, in accordance with exemplary embodiments.
Figure 2B:
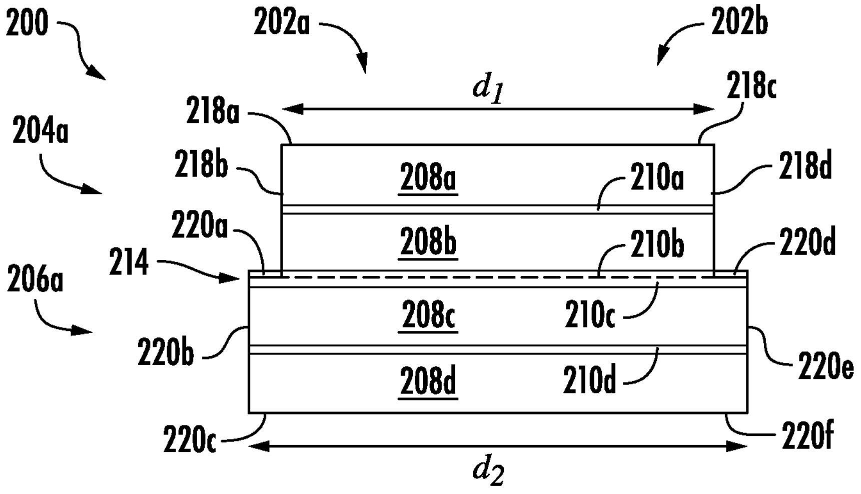
Figure 2C:
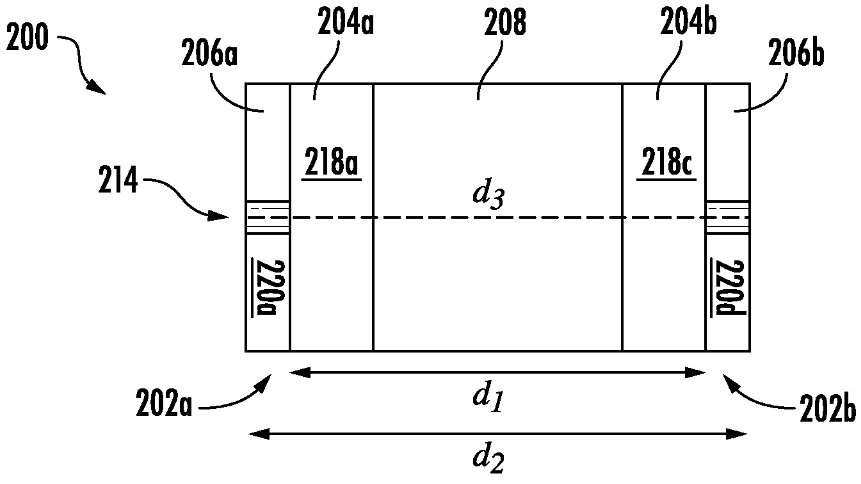
Figure 2D:
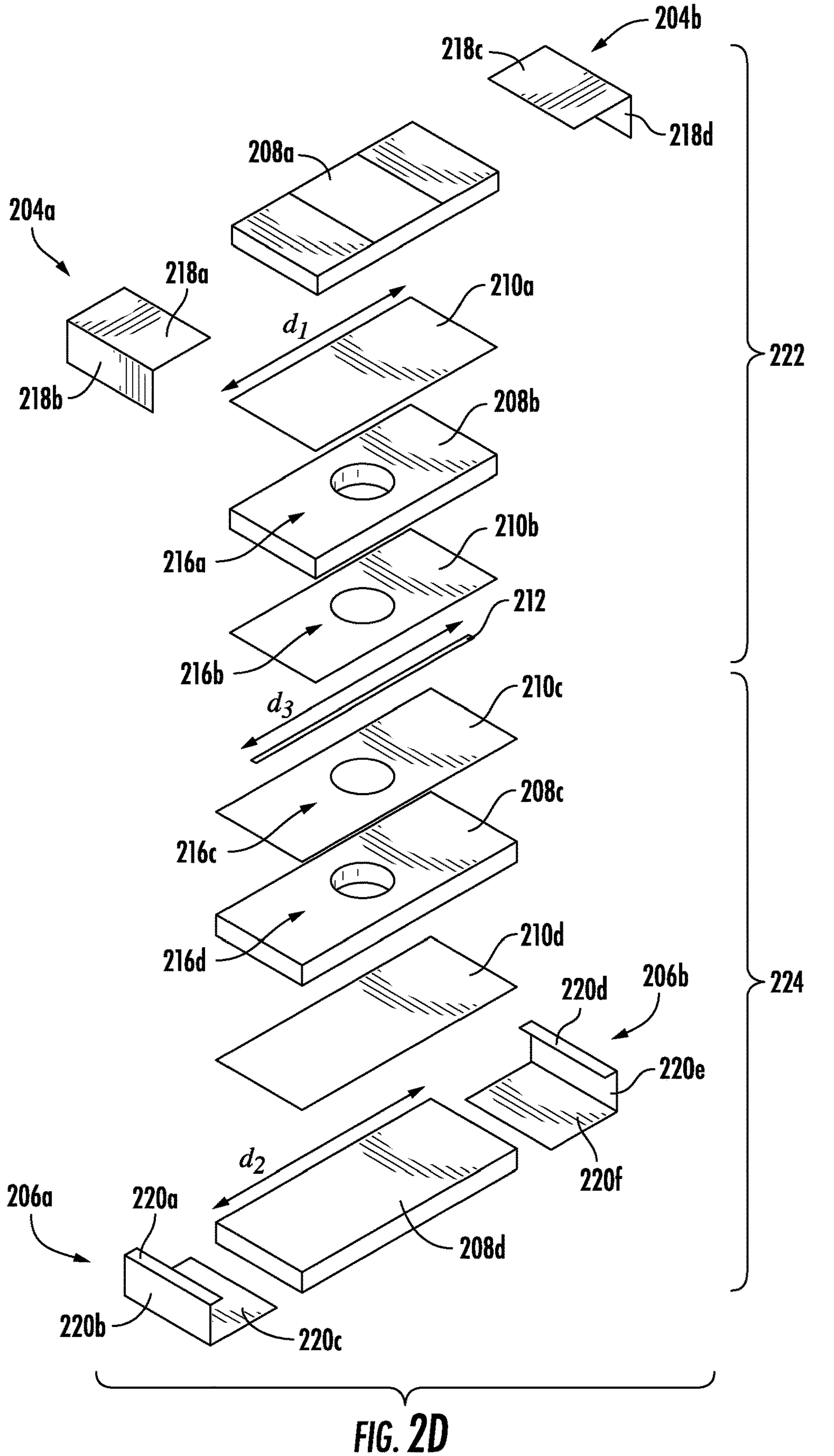

FIG. 2A is a perspective view, FIG. 2B is a side view, FIG. 2C is an overhead view, and FIG. 2D is an exploded perspective view of the step-terminated fuse 200. In exemplary embodiments, the step-terminated fuse 200 is a type of SMD, known herein also as an SMD fuse or step-terminated SMD fuse 200. In exemplary embodiments, the step-terminated SMD fuse 200 is a surface mount FR4 wire-in-air (WIA) fuse.

The step-terminated fuse 200 is made up of several layers, as shown in FIGS. 2B and 2D, with structural layers being alternated with epoxy layers. A top structural layer 208*a*, a mid-top structural layer 208*b*, a mid-bottom structural layer 208*c*, and a bottom structural layer 208*d* are shown (collectively, "structural layers 208"). In exemplary embodiments, the structural layers 208*a* and 208*d* are copper cladded fire retardant 4 (FR4) layers. These layers are alternated with epoxy layers 210*a*-210*d* (collectively, "epoxy layers 210").

Thus, as illustrated in FIG. 2D, the top structural layer 208*a* is adjacent the epoxy layer 210*b*, which is sandwiched between the top structural layer and the mid structural layer 208*b*. The mid structural layer 208*b* is also adjacent to a second epoxy layer 210*b*. A flattened wire 212 that operates as a fusible element for the step-terminated fuse 200 is disposed between the epoxy layer 210*b* and the epoxy layer 210*c*. Adjacent the epoxy layer 210*c* is another structural layer 208*c*, which is sandwiched between the epoxy layer 210*c* and another epoxy layer 210*d*. The structural layer 208*d* is adjacent the epoxy layer 210*d*, completing the stacked arrangement of the step-terminated fuse 200.

In non-limiting embodiments, each structural layer 208 has a thickness of 5 mils while each epoxy layer 210 has a thickness of 25 μm, while the flattened wire 212 has a diameter of 50 μm or more. The termination of the flattened wire 212 is shaped like a step, covering the exposed wires. The termination on the flattened wire is shaped like a step, whereas the termination plating 220*a* and 220*b* and 220*d* and 220*e* will then cover the exposed flattened wire. By not having castellations, the step-terminated fuse 200 reduces the risk of trapped plating residue, relative to legacy configurations that are castellated. Further, in exemplary embodiments, the flattened wire 212 is flattened to minimize the height of the step-terminated fuse 200.

In exemplary embodiments, several of the layers include apertures, which form a cavity inside which the flattened wire 212 is disposed. Structural layer 208*b* features aperture 216*a* and epoxy layer 210*b* features aperture 216*b* on one side of the flattened wire 212; similarly, epoxy layer 210*c* features aperture 216*c* and structural layer 208*c* features aperture 216*d* on the other side of the flattened wire (collectively, "apertures 216"). When the structural layers 208 and epoxy layers 210 are stacked, as illustrated, the apertures 216 form a cavity inside which the flattened wire 212 is disposed.

In exemplary embodiments, the layers of the alternating stack of structural and epoxy layers are not the same dimensions, with layers on one side of the flattened wire 212 having a first dimension, $d_1$, and layers on the other side of the flattened wire having a second dimension, $d_2$, where $d_2>d_1$. Thus, the stack making up the step-terminated fuse 200 may be thought of as having steps. In exemplary embodiments, structural layers 208*a* and 208*b* and epoxy layers 210*a* and 210*b* have dimension, $d_1$, while structural layers 208*c* and 208*d* and epoxy layers 210*c* and 210*d* have dimension, $d_2$.

Partially enclosing the alternating stack of structural and epoxy layers of the step-terminated fuse 200 are terminals

202*a* and 202*b* (collectively, "terminal(s) 202"). In exemplary embodiments, the terminals 202 are shaped to cover the ends of the alternating stack. Each terminal 202 therefore features sections to align with the shape of the stack made up of alternated structural layers 208 and epoxy layers 210. Terminal 202*a* features upper step 204*a* and lower step 206*a* while terminal 202*b* features upper step 204*b* and lower step 206*b* (collectively, "upper step(s) 204" and "lower step(s) 206"). In a non-limiting example, the upper steps 204 and lower steps 206 are made of electrically conductive material, such as a copper-nickel-tin alloy (CuNiSn).

In exemplary embodiments, each upper step 204 feature two orthogonally disposed surfaces. Upper step 204*a* is made up of surfaces 218*a* and 218*b* while upper step 204*b* is made up of surfaces 218*c* and 218*d* (collectively, "surfaces 218"). In exemplary embodiments, surface 218*a* of upper step 204*a* is orthogonal to surface 218*b* and surface 218*c* of upper step 204*b* is orthogonal to surface 218*d*. From the view of FIG. 2B, surfaces 218*a* and 218*c* are horizontally disposed while surfaces 218*b* and 218*d* are vertically disposed.

In exemplary embodiments, the lower steps 206 feature three orthogonally disposed surfaces. Lower step 206*a* is made up of surfaces 220*a*, 220*b*, and 220*c* while lower step 206*b* is made up of surfaces 220*d*, 220*e*, and 220*f* (collectively, "surfaces 220"). In exemplary embodiments, surface 220*a* of lower step 206*a* is orthogonal to surface 220*b*, surface 220*b* is orthogonal to surface 220*c*, and surfaces 220*a* and 220*c* are parallel to one another. Similarly, surface 220*d* of lower step 206*b* is orthogonal to surface 220*e*, surface 220*e* is orthogonal to surface 220*f*, and surfaces 220*d* and 220*f* are parallel to one another. From the view of FIG. 2B, surfaces 220*a*, 220*c*, 220*d*, and 220*f* are horizontally disposed while surfaces 220*b* and 220*e* are vertically disposed.

A fusible element location 214 is shown in FIGS. 2A-2C, with a dotted line in FIGS. 2B and 2C indicating the position of the flattened wire 212 (e.g., the fusible element) between the two steps of the layer stack. As also shown in FIG. 2D, the flattened wire 212 is seated between two epoxy layers 210*b* and 210*c*. In exemplary embodiments, the flattened wire 212 has a dimension, $d_3$, where $d_3>d_1$ and $d_3=d_2$. In some embodiments, $d_3=d_2$. In this way, the flattened wire 212 overlaps the dimension of the upper layers of the alternating stack of structural and epoxy layers of the step-terminated fuse 200. The benefits of this arrangement are shown in more detail in FIG. 3, below.

While the terminals 202 are characterized as each featuring an upper step 204 and a lower step 206, the step-terminated fuse 200 may also be thought of being made up of a stack of layers, the stack of layers having structural layers and epoxy layers. The stack may further be described as having an upper stack 222, consisting of structural layer 208*a*, adjacent epoxy layer 210*a*, structural layer 208*b*, and epoxy layer 210*b*, and a lower stack 224, consisting of epoxy layer 210*c*, structural layer 208*c*, epoxy layer 210*d*, and structural layer 208*d*. The layers of the upper stack 222 have dimension, $d_1$, while the layers of the lower stack 224 have dimension, $d_2$, with $d_1<d_2$. Because the upper stack 222 is atop the lower stack 224, with the flattened wire 212 therebetween, the arrangement causes the steps at the terminal ends of the step-terminated fuse 200. The stepwise arrangement is completed by having terminals 202 at each end of the step-terminated fuse 200, each terminal having surfaces 218 and 220, as already described herein, to envelope the surface of the upper and lower stack at the terminal ends.

Figure 3:
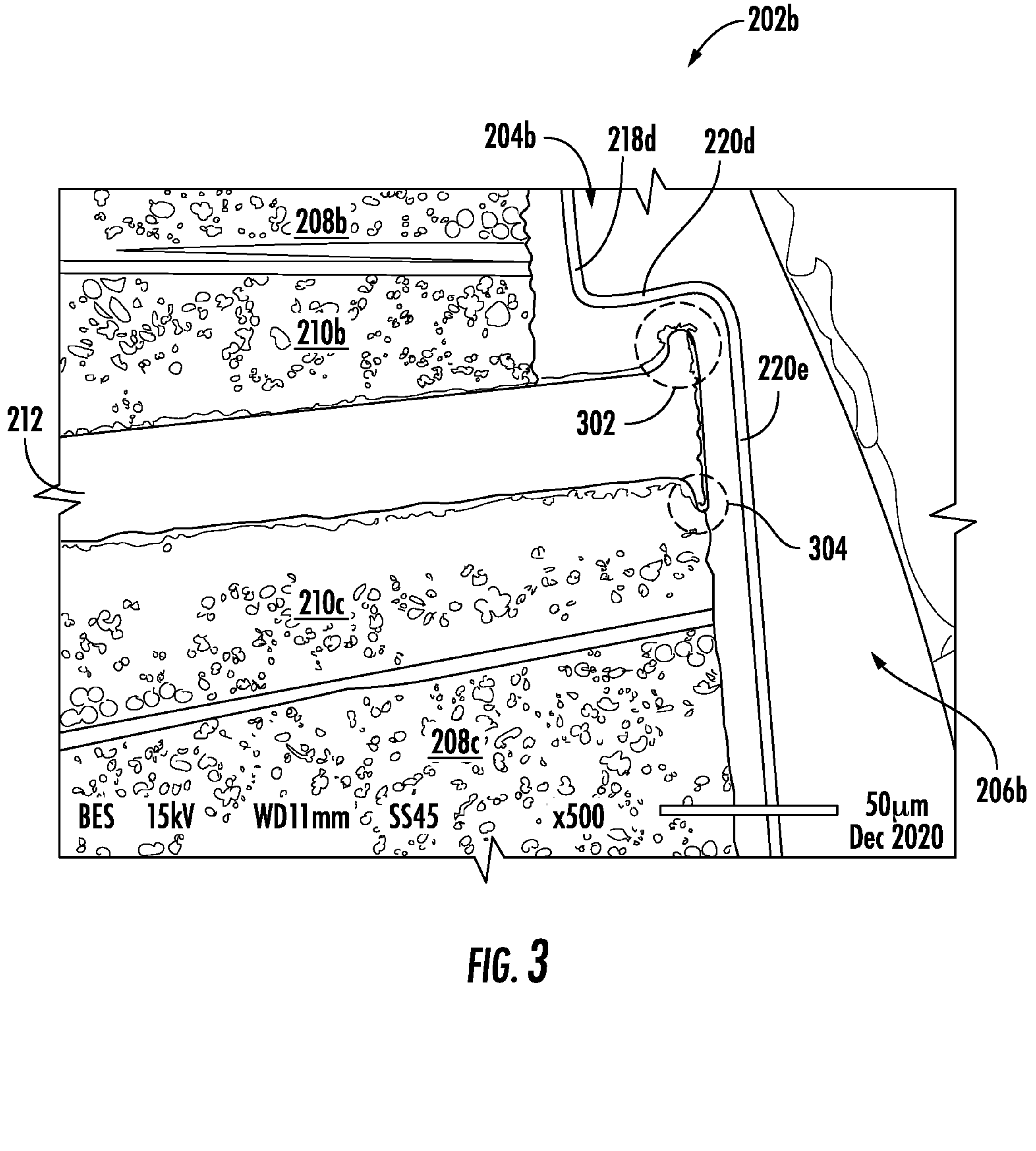
FIG. 3 is a diagram illustrating the step-terminated SMD fuse of FIGS. 2A-2D, in accordance with exemplary embodiments.

FIG. 3 is a representative image of a portion of the step-terminated fuse 200, according to exemplary embodiments. The close-up image shows in more detail the upper step 204*b* (including surface 218*d*) and the lower step 206*b* (including surfaces 220*d* and 220*e*) of terminal 202*b* of the step-terminated fuse 200. Structural layers 208*a* of copper-cladded FR4 are also shown. The flattened wire 212 extends horizontally between epoxy layers 210*b* and 210*c*, with a flattened end flush against surface 220*e* of the lower step 206*b*. In exemplary embodiments, the flattened wire 212 features an upper lip 302 and a lower lip 304. The upper lip 302 protrudes outward from an upper surface of one end of the flattened wire 212 while the lower lip 302 protrudes outward from a lower surface of the same end of the flattened wire, with the upper surface and lower surface being opposite one another and in parallel.

In exemplary embodiments, the upper lip 302 is adjacent surface 220*d* and surface 220*e* of terminal 202*b* while the lower lip 304 is adjacent the surface 220*e*. In the view of FIG. 3, the flattened wire 212 is partially disposed beneath the surface 220*d*. The other end (not shown) of the flattened wire 212 similarly features an upper lip and a lower lip. Thus, by shaping the flattened wire 212 with an upper lip 302 and a lower lip 304, the surface area of the flattened wire is increased at its ends, resulting in a larger area for external termination connectivity, that is, connection to the terminals 202.

By replacing castellated terminals with those having steps, the risk of trapped contamination is mitigated, resulting in a cost savings for manufacturers of the step-terminated fuse 200. Further, in exemplary embodiments, the step termination of the fuse 200 provides an increased area of bonding by plating on the cross-section and surface of the fusible element. By having the upper lip 302 and lower lip 304 on the ends of the flattened wire 212, as well as having the flattened wire sized (dimension $d_3$) to exceed the dimensions of the upper step ($d_1$) of the step-terminated fuse 200, that is, $d_3>d_1$, a better connectivity between the wire and the terminals can be achieved due to a larger surface of the wire being exposed to the termination. In exemplary embodiments, the step-terminated fuse 200 is able to be manufactured in smaller footprints, such as 1206 and 0603, the latter of which has been difficult to successfully manufacture.

In exemplary embodiments, the upper lip 302 and lower lip 304 of the flattened wire 212 provides more consistent solderability of the step-terminated fuse 200 on a printed circuit board. In some embodiments, a consistent 50% fillet shape is obtained using the step-terminated fuse 200 over legacy castellated fuses. A significantly improved solder filler height is obtained using the step-terminated fuse 200, as compared to legacy fuses, in some embodiments. Step-termination thus provides increased area of binding by plating on the cross-section and the surface of the flattened wire 212, in some embodiments.

Empirical data has also shown that developing a 0603 footprint fuse with a high $I^2t$ value and high breaking capacity is possible with this step-terminated fuse 200 design. $I^2t$ is an expression of the available thermal energy resulting from current flow. With regard to fuses, the term is usually expressed as melting, arcing, and total clearing $I^2t$, expressed in ampere-squared-seconds [$A^2s$]. Melting $I^2t$: the thermal energy required to melt a specific fuse element. Arcing $I^2t$: the thermal energy passed by a fuse during the arcing time. The magnitude of arcing $I^2t$ is a function of the available voltage and stored energy in the circuit. Total clearing $I^2t$: the thermal energy through the fuse from overcurrent inception until current is completely interrupted. Total clearing $I^2t$=(melting $I^2t$)+(arcing $I^2t$). Interrupting rating (also known as breaking capacity or short circuit rating) is the maximum current which the fuse can safely interrupt at the rated voltage.

For most fuses, breaking capacities have an inverse correlation to $I^2t$—increasing cross sectional area to attain high $I^2t$ creates too much mass for the fuse to pass high breaking capacities, or vice-versa. The challenge from a design perspective has been to find the balance between the two fuse characteristics, while still meeting all the other electrical and dimensional requirements.

Table 1 shows the results of testing a step-terminated fuse at 750 mA and 2 A, according to exemplary embodiments. The resistance and $I^2t$ results compare favorably with castellated fuses having a similar footprint (size) and rating.

TABLE 1

Resistance and $I^2t$ for step-terminated fuse

| rating | resistance (ohms) | $I^2t$ ($A^2s$) |
|---|---|---|
| 750 mA | 0.344 | 0.032 |
| 2 A | 0.112 | 0.277 |

Figure 4:
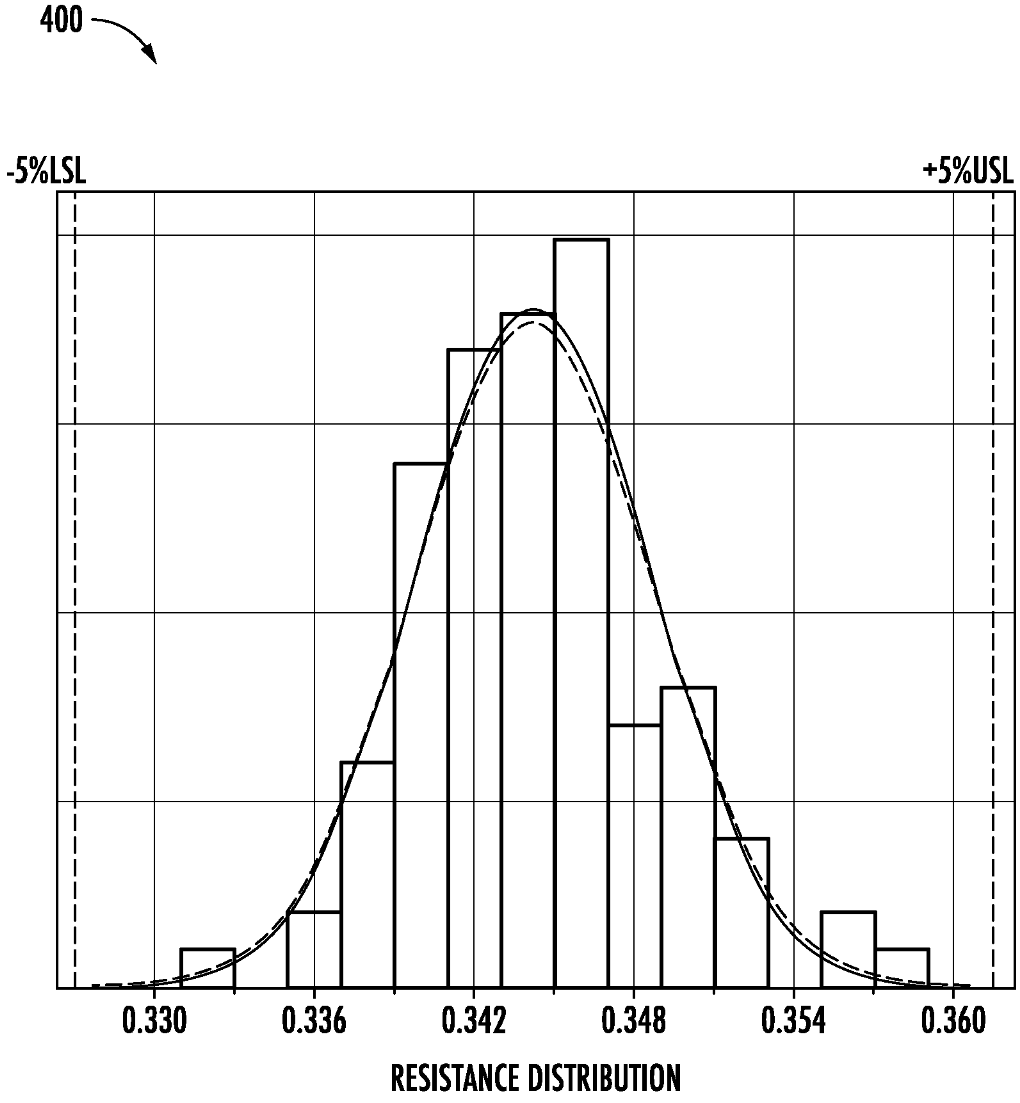
FIG. 4 is a resistance distribution graph, in accordance with exemplary embodiments.

FIG. 4 is a resistance distribution graph 400 for a step-terminated fuse, according to exemplary embodiments. The resistance distribution graph 400 shows that the data falls on +5% (upper spec limits) and −5% (lower spec limits) specification limits. Ideally, the step-terminated fuse will pass this very minimal resistance.

Figure 5:
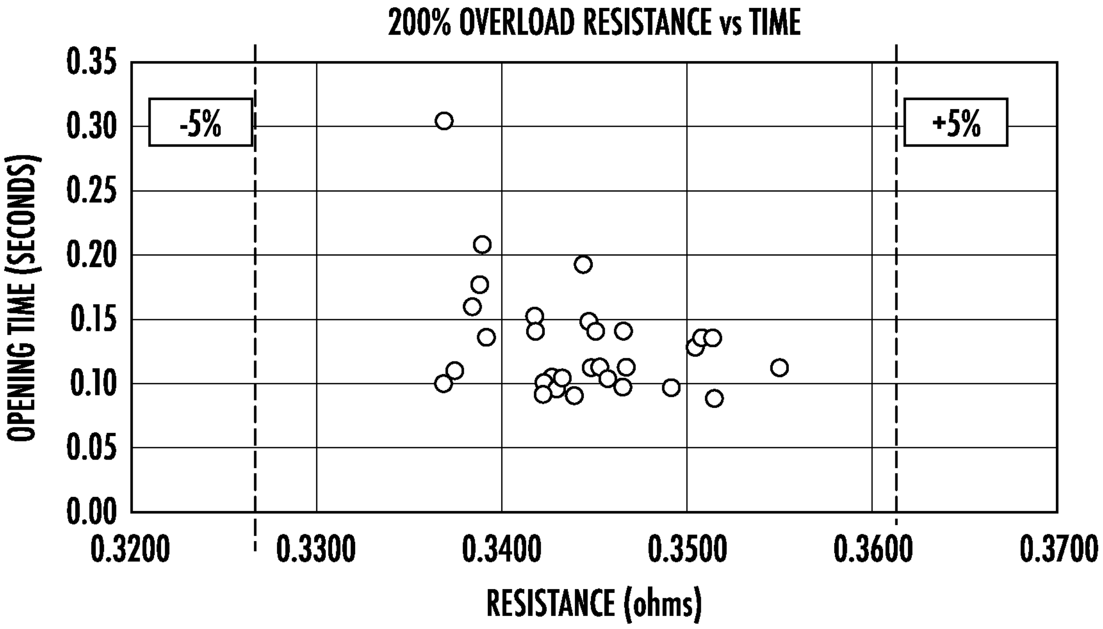
FIG. 5 is an overload resistance graph, in accordance with exemplary embodiments.

FIG. 5 is a graph 500 plotting overload resistance versus opening time of a step-terminated fuse, according to exemplary embodiments. The graph 500 plots the result of a standard test performed on fuses. If the fuse is subjected to 200% overload, the part should open within five seconds. The graph 500 shows opening times of 0.1 seconds to about 0.31 seconds, which is well within the specification. Favorably, the opening time should be less than five seconds opening time as long as the resistance values fall on the specification limits.

The graphs 400 and 500 show that the step-terminated fuse provides a very high $I^2t$ and breaking capacity while opening at 200% overload, in some embodiments. In exemplary embodiments, the step-terminated fuse 200 is also AECQ-compliant. AECQ is an industry standard specification that outlines the recommended new product and major change qualification requirements and procedures for packaged integrated circuits.

Further, in some embodiments, the increased area of the terminals 202, as compared to legacy fuses having castellated terminals, prevents pulse testing failure. An increase heat sink on terminal area makes the step-terminated fuse 200 more robust on pulse test, in some embodiments. Further, the step-terminated fuse 200 provides a very high inrush current capability ($I^2t$) as compared to thin film and ceramic chip fuses. In empirical tests, the pulse and $I^2t$ test (related to the heat sink) were separated from the mechanical, vibration and short circuit (related to the increased bonding area).

The step-termination provides an increased bonding area, resulting in added strength in seal quality as compared to WIA FR4 castellated terminals. This results to passing the mechanical test, high frequency vibration test and short circuit test.

In non-limiting embodiments, a gap is established to ensure consistency of the element exposure, using a blade thickness minimum of 200 m.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. A fuse comprising:

a stack comprising a first plurality of layers and a second plurality of layers arranged to form steps, the stack further comprising:

an upper stack comprising the first plurality of layers, wherein the first plurality of layers are of a first dimension; and a lower stack comprising the second plurality of layers, wherein the second plurality of layers are of a second dimension, the second dimension being larger than the first dimension;

a flattened wire disposed between the upper stack and the lower stack; and a terminal coupled to the flattened wire, the terminal comprising a plurality of surfaces to cover the steps at one end of the stack, the plurality of surfaces comprising:

a pair of surfaces covering, and in direct contact with, a first step of the stack; and a triad of surfaces covering, and in direct contact with, a second step of the stack;

wherein the pair of surfaces extends from a top of the triad of surfaces.

2. The fuse of claim 1, wherein the pair of surfaces comprise a first surface and a second surface, wherein the first surface is orthogonal to the second surface.

3. The fuse of claim 1, wherein the triad of surfaces comprise a first surface, a second surface, and a third surface, wherein the first surface is orthogonal to the second surface, the second surface is orthogonal to the third surface, and the first surface is parallel to the third surface.

4. The fuse of claim 3, the flattened wire further comprising:

an upper lip adjacent the first surface and the second surface; and a lower lip adjacent the second surface;

wherein the flattened wire is partially disposed beneath the first surface.

5. The fuse of claim 1, wherein the flattened wire is of a third dimension, the third dimension being larger than the first dimension.

6. The fuse of claim 5, wherein the third dimension is smaller than the second dimension.

7. The fuse of claim 5, wherein the third dimension is equal to the second dimension.

8. The fuse of claim 1, the first plurality of layers further comprising:

a first structural layer;

a first epoxy layer adjacent the first structural layer;

a second structural layer adjacent the first epoxy layer, wherein the first epoxy layer is sandwiched between the first structural layer and the second structural layer; and a second epoxy layer adjacent the second structural layer, wherein the second structural layer is sandwiched between the first epoxy layer and the second epoxy layer.

9. The fuse of claim 8, wherein:

the second structural layer comprises a first aperture; and the second epoxy layer comprises a second aperture, wherein the flattened wire sits in a cavity partially formed by the first aperture and the second aperture.

10. The fuse of claim 7, the second plurality of layers further comprising:

a third epoxy layer;

a third structural layer adjacent the third epoxy layer;

a fourth epoxy layer adjacent the third structural layer, wherein the third structural layer is sandwiched between the third epoxy layer and the fourth epoxy layer; and a fourth structural layer adjacent the fourth epoxy layer, wherein the fourth epoxy layer is sandwiched between the third structural layer and the fourth structural layer.

11. The fuse of claim 8, wherein:

the second structural layer comprises a first aperture;

the second epoxy layer comprises a second aperture;

the third epoxy layer comprises a third aperture; and the third structural layer comprises a fourth aperture, wherein the flattened wire sits in a cavity formed by the first aperture, the second aperture, the third aperture, and the fourth aperture.

* * * * *